US009250652B2

(12) United States Patent
London et al.

(10) Patent No.: US 9,250,652 B2
(45) Date of Patent: Feb. 2, 2016

(54) ELECTRONIC DEVICE CASE

(71) Applicant: Hand Held Products, Inc., Fort Mill, SC (US)

(72) Inventors: Lisa London, Syracuse, NY (US); Timothy R. Fitch, Syracuse, NY (US); Taylor Smith, Charlotte, NC (US); Mark Schmidt, Waxhaw, NC (US); Mark Oberpriller, Atlanta, GA (US)

(73) Assignee: Hand Held Products, Inc., Fort Mill, SC (US)

( * ) Notice: Subject to any disclaimer, the term of this patent is extended or adjusted under 35 U.S.C. 154(b) by 296 days.

(21) Appl. No.: 13/933,415

(22) Filed: Jul. 2, 2013

(65) Prior Publication Data

US 2015/0009610 A1  Jan. 8, 2015

(51) Int. Cl.
*G06F 1/16*  (2006.01)

(52) U.S. Cl.
CPC .............. *G06F 1/163* (2013.01); *G06F 1/1628* (2013.01); *Y10T 16/4567* (2015.01)

(58) Field of Classification Search
CPC ... G06F 1/1607; G06F 1/1615; G06F 1/1628; G06F 1/163; G06F 1/1656
USPC ...................................... 361/679.03
See application file for complete search history.

(56) References Cited

U.S. PATENT DOCUMENTS

| | | | |
|---|---|---|---|
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 7,764,488 B2 * | 7/2010 | Calvarese | ................ 361/679.03 |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 13/367,978, filed Feb. 7, 2012, (Feng et al.); now abandoned.

(Continued)

*Primary Examiner* — Anthony Q Edwards
(74) *Attorney, Agent, or Firm* — Additon, Higgins & Pendleton, P.A.

(57) ABSTRACT

A handle for an electronic-device case includes a hand strap and a switch. The switch may be integrated into the hand strap such that when the user secures his or her hand to the electronic-device case with the hand strap, the switch is accessible to the secured hand, thereby enabling one-handed operation of the electronic device.

20 Claims, 21 Drawing Sheets

(56) References Cited

U.S. PATENT DOCUMENTS

| | | |
|---|---|---|
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,317 B2 * | 10/2013 | Hyseni .......... 224/197 |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,690,210 B1 * | 4/2014 | May .......... 294/25 |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,887,970 B2 * | 11/2014 | Tsai et al. .......... 224/217 |
| 2003/0213822 A1 * | 11/2003 | Lautner .......... 224/221 |
| 2004/0226973 A1 * | 11/2004 | Kao .......... 224/218 |
| 2007/0063048 A1 | 3/2007 | Havens et al. |
| 2008/0054039 A1 * | 3/2008 | Wulff et al. .......... 224/575 |
| 2008/0185432 A1 | 8/2008 | Caballero et al. |
| 2009/0134221 A1 | 5/2009 | Zhu et al. |
| 2009/0219677 A1 * | 9/2009 | Mori et al. .......... 361/679.03 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0296235 A1 * | 11/2010 | Takemasa et al. .......... 361/679.21 |
| 2011/0169999 A1 | 7/2011 | Grunow et al. |
| 2011/0202554 A1 | 8/2011 | Powilleit et al. |
| 2011/0240830 A1 * | 10/2011 | Alemozafar et al. .......... 248/689 |
| 2011/0267748 A1 * | 11/2011 | Lane et al. .......... 361/679.01 |
| 2011/0279959 A1 * | 11/2011 | Lopez .......... 361/679.03 |
| 2011/0303709 A1 * | 12/2011 | Wizikowski .......... 224/218 |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0228346 A1 * | 9/2012 | Huang .......... 224/218 |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |

(56) References Cited

U.S. PATENT DOCUMENTS

| | | |
|---|---|---|
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |

OTHER PUBLICATIONS

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

U.S. Appl. No. 14/154,915 for Laser Scanning Module Employing a Laser Scanning Assembly having Elastomeric Wheel Hinges, filed Jan. 14, 2014 (Havens et al.); 24 pages.

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion filed Mar. 4, 2014 (Lui et al.); 25 pages.

U.S. Appl. No. 14/342,544 for Imaging Based Barcode Scanner Engine with Multiple Elements Supported on a Common Printed Circuit Board filed Mar. 4, 2014 (Liu et al.); 27 pages.

U.S. Appl. No. 14/257,174 for Reading Apparatus Having Partial Frame Operating Mode filed Apr. 21, 2014, (Barber et al.), 67 pages.

U.S. Appl. No. 14/200,405 for Indicia Reader for Size-Limited Applications filed Mar. 7, 2014 (Feng et al.); 42 pages.

U.S. Appl. No. 14/166,103 for Indicia Reading Terminal Including Optical Filter filed Jan. 28, 2014 (Lu et al.); 29 pages.

U.S. Appl. No. 14/274,858 for Mobile Printer With Optional Battery Accessory, filed May 12, 2014, (Marty et al.), 26 pages.

(56) References Cited

OTHER PUBLICATIONS

U.S. Appl. No. 14/264,173 for Autofocus Lens System for Indicia Readers filed Apr. 29, 2014, (Ackley et al.), 39 pages.

U.S. Appl. No. 14/230,322 for Focus Module and Components with Actuator filed Mar. 31, 2014 (Feng et al.); 92 pages.

U.S. Appl. No. 14/222,994 for Method and Apparatus for Reading Optical Indicia Using a Plurality of Data filed Mar. 24, 2014 (Smith et al.); 30 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 29/486,759 for an Imaging Terminal, filed Apr. 2, 2014 (Oberpriller et al.); 8 pages.

U.S. Appl. No. 29/436,337 for an Electronic Device, filed Nov. 5, 2012 (Fitch et al.); 19 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 29/459,681 for an Electronic Device Enclosure, filed Jul. 2, 2013 (Chaney et al.); 14 pages.

U.S. Appl. No. 29/459,785 for a Scanner and Charging Base, filed Jul. 3, 2013 (Fitch et al.); 21 pages.

U.S. Appl. No. 29/459,823 for a Scanner, filed Jul. 3, 2013 (Zhou et al.); 13 pages.

U.S. Appl. No. 29/468,118 for an Electronic Device Case, filed Sep. 26, 2013 (Oberpriller et al.); 44 pages.

\* cited by examiner

ELECTRONIC DEVICE CASE

FIELD OF THE INVENTION

The present invention relates to the field of enclosures for electronic devices, and, more specifically, to an electronic-device case providing the electronic device with additional capabilities.

BACKGROUND

Mobile computer devices have enjoyed increased usage for both personal and business purposes. Businesses have gravitated to the use of mobile computer devices for their ease of use and their ability to travel with a mobile workforce. For example, mobile computer devices may be distributed among workers in a warehouse setting for use in different areas of the warehouse. A worker might use a mobile computer device to record inventory by using the mobile computer device to read a code symbol (e.g., barcode) on the inventory item. The same worker might then use the mobile computer device to run an application that manages the inventory. This versatility is a primary attraction of these mobile computer devices, such as tablet computers and smartphones.

Use of a mobile computer device in a work setting can present unique problems. Because these devices typically require two hands to operate, the user may find it difficult to perform certain tasks with a mobile computer device. For example, to scan a code symbol, the user often needs to manipulate the object (e.g., a package) having a barcode while performing a scan. Since both of the user's hands are occupied with the mobile computer device (e.g., one hand holding the device and the other hand manipulating the controls, such as a touch screen), there is no free hand to manipulate the object.

Therefore, a need exists for an apparatus that will allow for one-handed operation of an electronic device.

SUMMARY

Accordingly, in one aspect, the present invention embraces a handle for an electronic-device case. The handle includes a hand strap and a switch for generating a signal. The switch is integral with the hand strap.

In an exemplary embodiment, the handle according to the present invention includes a connector for affixing the hand strap to the electronic-device case.

In another exemplary embodiment, the handle according to the present invention includes a connector that is a rotating connector that permits the electronic-device case to rotate with respect to the hand strap.

In yet another exemplary embodiment, the handle according to the present invention includes a connector that is a swivel-mount connector that permits the electronic-device case to swivel with respect to the hand strap.

In another exemplary embodiment, the handle according to the present invention includes a switch that is positioned on, or otherwise integrated into, the connector.

In another exemplary embodiment, the handle according to the present invention includes a switch that is positioned on, or otherwise integrated into, the hand strap.

In another exemplary embodiment, the handle according to the present invention includes a switch that is positioned on, or otherwise integrated into, the electronic-device case.

In yet another exemplary embodiment, the handle according to the present invention includes a switch that is adapted for communicative connection with the electronic-device case.

In another exemplary embodiment, the handle according to the present invention includes a switch that is adapted for communicative connection with a computer, such as a computer positioned within the electronic-device case.

In another aspect, the present invention embraces an electronic-device casing assembly. In an exemplary embodiment, the electronic-device casing assembly includes an electronic-device case for holding a mobile computer device. The electronic-device casing assembly also includes a hand strap for securing a user's hand to the electronic-device case. The hand strap is connected (e.g., rotatably connected) to the electronic-device case. The electronic-device casing assembly also includes a switch for generating a signal. The switch is configured for operation by the user's hand. The electronic-device casing assembly is adapted to communicate with the mobile computer device.

In another exemplary embodiment, the electronic-device casing assembly according to the present invention includes a connector for affixing the hand strap to the electronic-device case.

In yet another exemplary embodiment, the electronic-device casing assembly according to the present invention includes a connector that permits the electronic-device case to rotate and/or swivel with respect to the hand strap.

In still another exemplary embodiment, the electronic-device casing assembly according to the present invention includes a switch that is positioned on, or otherwise integrated into, the connector.

In another exemplary embodiment, the electronic-device casing assembly according to the present invention includes a switch that is positioned on, or otherwise integrated into, the hand strap.

In yet another exemplary embodiment, the electronic-device casing assembly according to the present invention includes a switch that is positioned on, or otherwise integrated into, the electronic-device case.

In another exemplary embodiment, the electronic-device casing assembly according to the present invention includes a switch that is communicatively connected to the electronic-device case.

In yet another exemplary embodiment, the electronic-device casing assembly according to the present invention includes a switch that is adapted for communicative connection with the mobile computer device, such as a mobile computer device positioned within the electronic-device case.

In still another aspect, the invention embraces an electronic-device casing assembly that includes an electronic-device case for securing a mobile compute device. The electronic-device casing assembly also includes a finger support positioned on, or otherwise integrated into, the electronic-device case to facilitate one-handed operation of the electronic-device casing assembly and the mobile computer device. The finger support includes a first signal-generating switch, a second signal-generating switch, and a finger rest positioned between the first signal-generating switch and the second signal-generating switch. The electronic-device casing assembly is adapted to communicate with the mobile computer device.

In an alternative exemplary embodiment, the electronic-device casing assembly according to the present invention includes a hand strap for securing a user's hand to the electronic-device case. The hand strap is connected to the electronic-device case.

In yet another exemplary embodiment, the electronic-device casing assembly according to the present invention includes a connector for affixing the hand strap to the electronic-device case.

In another exemplary embodiment, the electronic-device casing assembly according to the present invention includes a connector that permits the electronic-device case to rotate and/or swivel with respect to the hand strap.

In yet another exemplary embodiment, the electronic-device casing assembly according to the present invention includes an arm support (e.g., an arm loop) for securing a user's arm to the electronic-device casing assembly so as to position the user's hand upon the electronic-device case and the user's fingers near the finger support.

In another exemplary embodiment, the electronic-device casing assembly according to the present invention is configured such that the first signal-generating switch and/or the second signal-generating switch are communicatively connected to the electronic-device case.

In another exemplary embodiment, the electronic-device casing assembly according the present invention is configured such that the first signal-generating switch and/or the second signal-generating switch are adapted for communicative connection with the mobile computer device, which mobile computer device may be positioned within the electronic device case.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
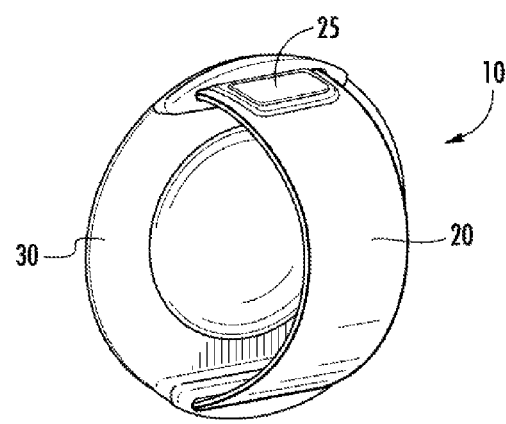
FIG. 1 graphically depicts a perspective view of an exemplary handle for an electronic-device case according to the present invention.
Figure 2:
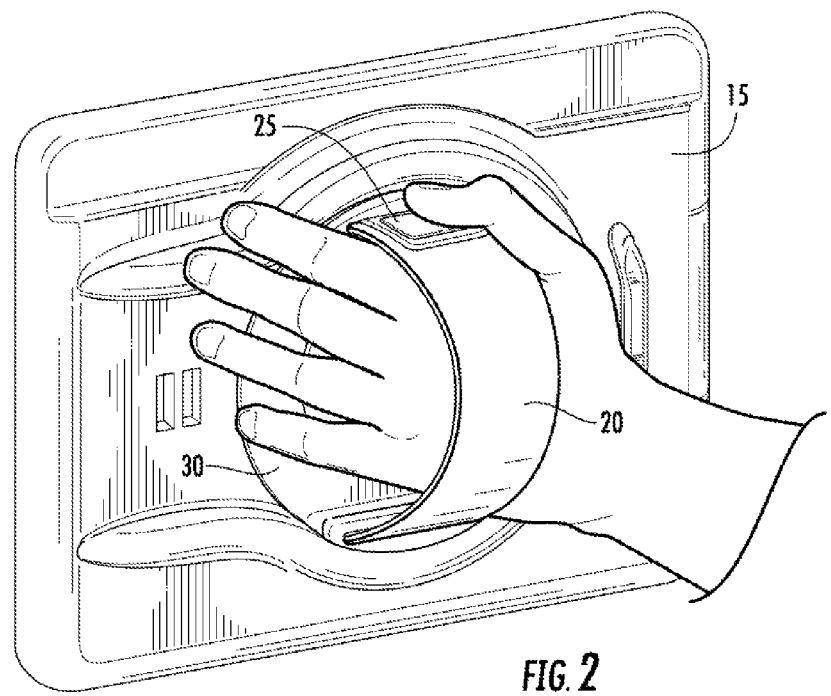
FIG. 2 graphically depicts a perspective view of a user's hand inserted into an exemplary handle according to the present invention.

The present invention embraces a handle for an electronic-device case. Reference is now made to FIGS. 1 and 2. In an exemplary embodiment, the handle 10 according to the present invention includes a hand strap 20 and a switch 25 (e.g., trigger) for generating a signal. The switch 25 is integral with the hand strap 20. It will be appreciated by a person of ordinary skill in the art that the switch 25 may be integrated into the hand strap 20 in a variety of ways. For example, the switch 25 may be positioned on the exterior of the hand strap 20. As another example, the switch 25 may be positioned inside the hand strap 20 such that applying pressure to the exterior of the hand strap 20 results in pressure being applied to the switch 25 within, thereby resulting in an activation of the switch 25. In FIGS. 1 and 2, the switch 25 is positioned on the hand strap 20 adjacent the location where the hand strap 20 attaches to the electronic-device case 15, thereby facilitating the activation of the switch 25 by the user's thumb when the user's hand is inserted through the hand strap 20. Integrating the switch 25 into the hand strap 20 permits the user to use the same hand to both hold the electronic-device case 15 and to activate the switch 25. In other words, the integrated switch 25 allows for one-handed operation, thereby permitting the user's free hand (i.e., the hand that is engaged with the handle 10) to perform other tasks such as holding an object to be scanned.

In an exemplary embodiment, the handle 10 may include a connector 30 for affixing the hand strap 20 to the electronic-device case 15. Typically, the connector 30 is a mechanical connection that allows the hand strap 20 to be moveably connected to the electronic-device case 15. For example, the connector 30 may be a rotating connector that permits the electronic-device case 15 to rotate with respect to the hand strap 20. This rotation feature would allow the user to rotate the mobile-computer device housed within the electronic-device case 15 into a landscape or portrait orientation without having to reposition their hand within the hand strap 20. As another example, the connector 30 may be a swivel-mount connector that permits the electronic-device case 15 to swivel with respect to the hand strap 20. The swivel action would allow the user to adjust the screen angle (e.g., tilt the screen horizontally or vertically) as desired without having to reposition their hand within the handle 10.

In an alternative exemplary embodiment, the switch 25 is positioned on, or is otherwise integrated into, the connector 30. Alternatively, the switch 25 may be positioned on, or otherwise integrated into, the electronic-device case 15. Whether the switch 25 is positioned on the connector 30 or on the electronic-device case 15, the switch 25 is positioned such that it may be activated by the user's hand while the hand is secured to the handle 10. This allows for the user to hold the device with the handle 10 using the same hand that activates the switch 25, thereby permitting one-handed operation.

The signal generated by the switch 25 typically initiates a user command. For example, the switch 25 may be activated by the user to initiate the scanning of a code symbol (e.g., a barcode). Typically, the switch 25 is adapted for communicative connection with the electronic-device case 15, which electronic-device case typically retransmits the signal to a mobile-computer device (e.g., tablet computer, smartphone), which is typically positioned within the electronic-device case 15. As an alternative example, the switch 25 is adapted for communicative connection with a mobile-computer device. The connection between the switch 25 and the electronic-device case 15 or the switch 25 and the mobile-computer device may be wired or wireless (e.g., Bluetooth, infrared).

Figure 3:
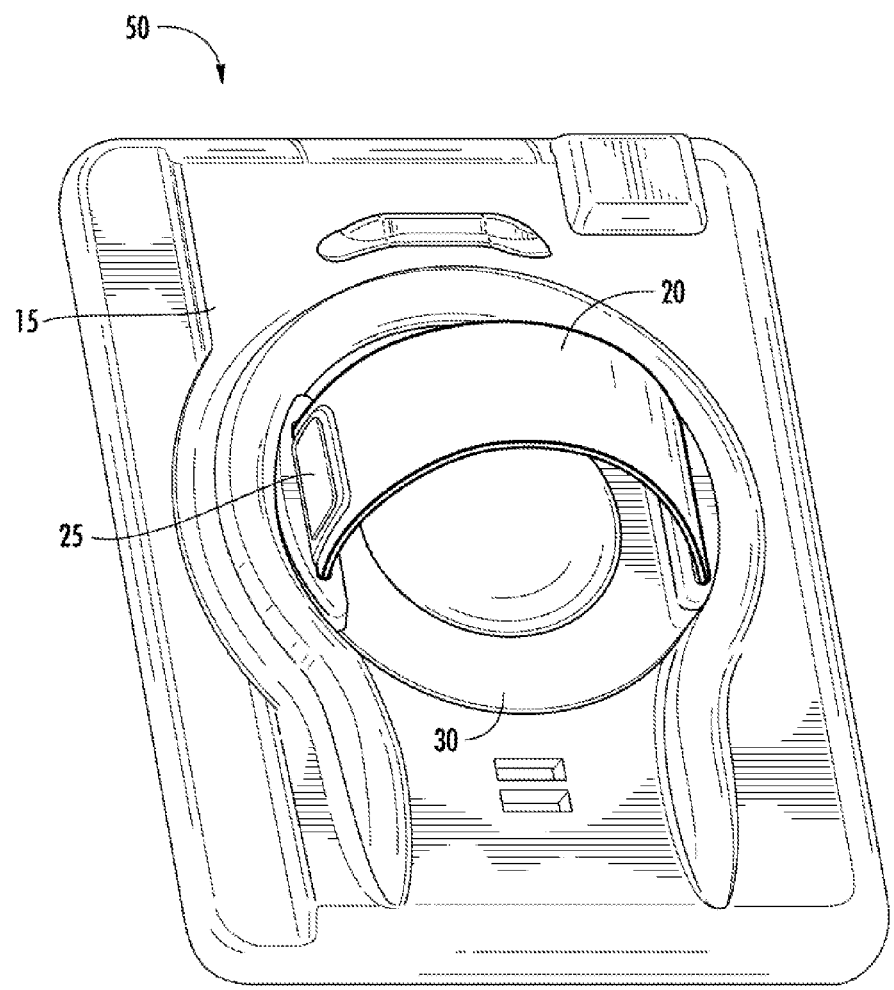
FIG. 3 graphically depicts a front perspective view of an exemplary electronic-device casing assembly according to the present invention.

In another aspect, the disclosure embraces an electronic-device casing assembly. Referring now to FIG. 3, the electronic-device casing assembly 50 includes an electronic-device case 15 for holding a mobile computer device such as a tablet computer or a smartphone. The electronic-device casing assembly 50 according to the present invention also includes a hand strap 20 for securing a user's hand to the electronic-device case 15. The hand strap 20 is connected to the electronic-device case 15. Typically, the hand strap 20 is movably connected to the electronic-device case 15. More typically, the hand strap 20 is rotatably connected or swivel connected to the electronic-device case 15. The electronic-device casing assembly 50 according to the present disclosure also includes a switch 25 for generating a signal. The switch is configured and positioned for operation (e.g., manipulation) by the user using the same hand that is secured to the electronic-device case 15 by the hand strap 20. The electronic-device casing assembly 50 is adapted to communicate (e.g., electronically communicate) with the mobile computer device. For example, when the user activates the switch 25 on the electronic-device casing assembly 50, the electronic-device casing assembly 50 transmits the signal to the mobile computer device indicating the user selection (e.g., signal instructing mobile computer device to scan a code symbol).

In an exemplary embodiment, the electronic-device casing assembly 50 according to the present disclosure includes a connector 30 for affixing the hand strap 20 to the electronic-device case 15. Typically, the connector 30 permits the electronic-device case 15 to rotate and/or swivel with respect to the hand strap 20. The switch 25 may be positioned on, or otherwise integrated into, the hand strap 20, the connector 30 or the electronic-device case 15. The switch 25 may be communicatively connected to the electronic-device case 15, or the switch 25 may be adapted for direct or indirect communicative connection with the mobile computer device. In other words, the signal from the switch 25 may be transmitted directly to the mobile computer device (e.g., via a wired or wireless connection), or the signal may first pass through the electronic-device case 15 before being relayed on to the mobile computer device.

Figure 4:
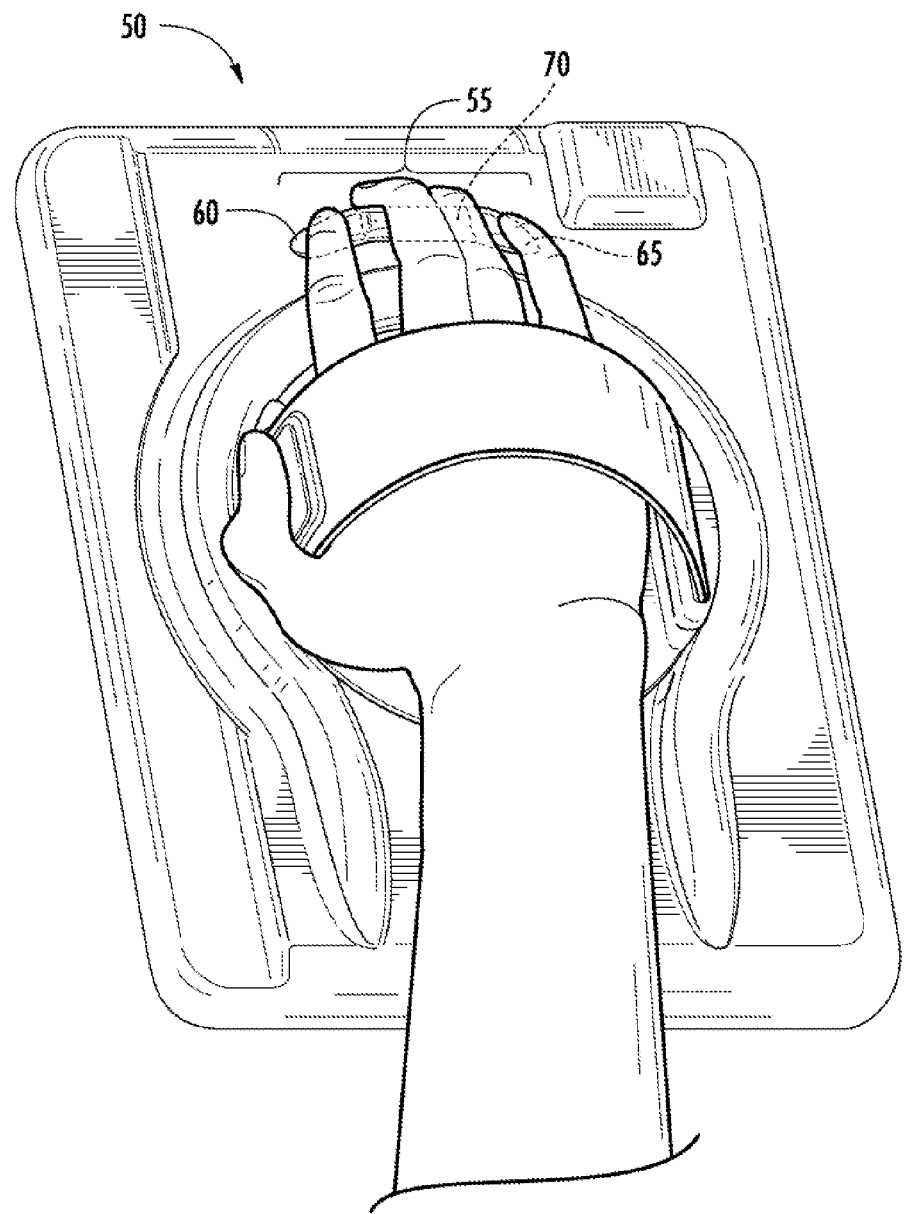
FIG. 4 graphically depicts a front perspective view of an exemplary electronic-device casing assembly according to the present invention with a user's fingers placed on the finger support.

In another aspect, the disclosure embraces an electronic-device casing assembly 50 that enables one-handed operation of a mobile computer device while inhibiting accidental user selection. Referring now to FIG. 4, the electronic-device casing assembly 50 according to the present disclosure includes a finger support 55 positioned on, or otherwise integrated into, the electronic-device case 15 to facilitate one-handed operation of the electronic-device casing assembly 50 and the mobile computer device. The finger support includes a first signal-generating switch 60 and a second signal-generating switch 65. Having a first signal-generating switch 60 and a second signal-generating switch 65 provides greater capability for allowing for multiple types of user inputs. For example, the first signal-generating switch 60 could be configured to initiate a first type of user selection, and the second signal-generating switch 65 could be configured to initiate a second type of user selection. Simultaneous activation of the first signal-generating switch 60 and the second signal-generating switch 65 could initiate yet a third type of user selection.

The electronic-device casing assembly 50 also includes a finger rest 70. The finger rest 70 is an area on the electronic-device casing assembly 50 that does not have any trigger or switch such that positioning of the user's fingers on the finger rest does not activate any trigger or switch. The finger rest is positioned between the first signal-generating switch 60 and the second signal-generating switch 65, thereby permitting a user to position one or more inner fingers (e.g., middle finger and ring finger) on the finger rest 70 without inadvertently activating a switch. In this way, the user may stabilize the electronic-device casing assembly 50 with at least one finger positioned on the finger rest in between the first signal-generating switch 60 and the second signal-generating switch 65, while still being able to operate (e.g., manipulate) the first signal-generating switch 60 and the second signal-generating switch 65 with the user's outside fingers (e.g., small finger and pointer finger). The finger rest 70 may be a raised portion on the electronic-device case 15 as shown in FIG. 4. Alternatively, the finger rest 70 may be an indented area of the electronic-device case 15, or it may be a flat area. To enable functionality in different orientations (e.g., landscape mode or portrait mode) of the electronic-device casing, there may be more than one finger rests 70. By providing a finger rest that allows the user to stabilize the electronic-device casing assembly 50 in the user's hand without inadvertently activating a switch, the electronic-device casing assembly 50 according to the present invention provides for more reliable, stable, one-handed operation.

Figure 5:
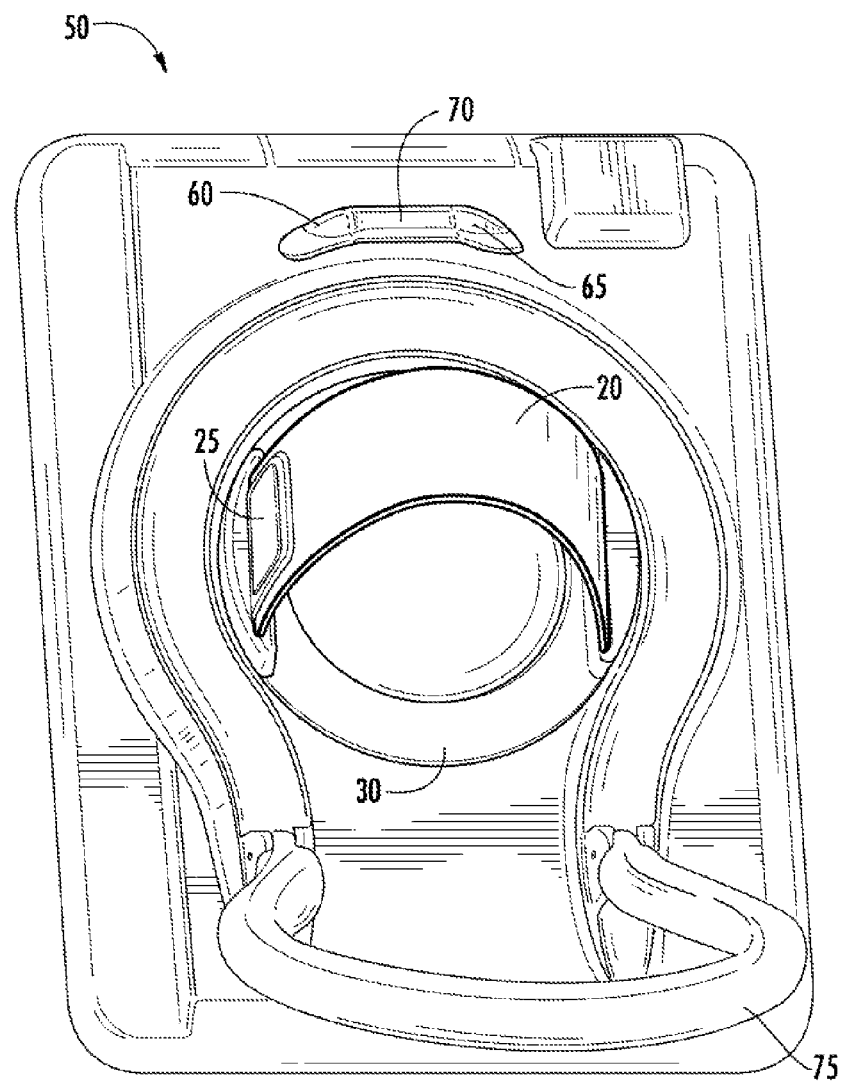
FIG. 5 graphically depicts a front perspective view of an exemplary electronic-device casing assembly according to the present invention.
Figure 6:
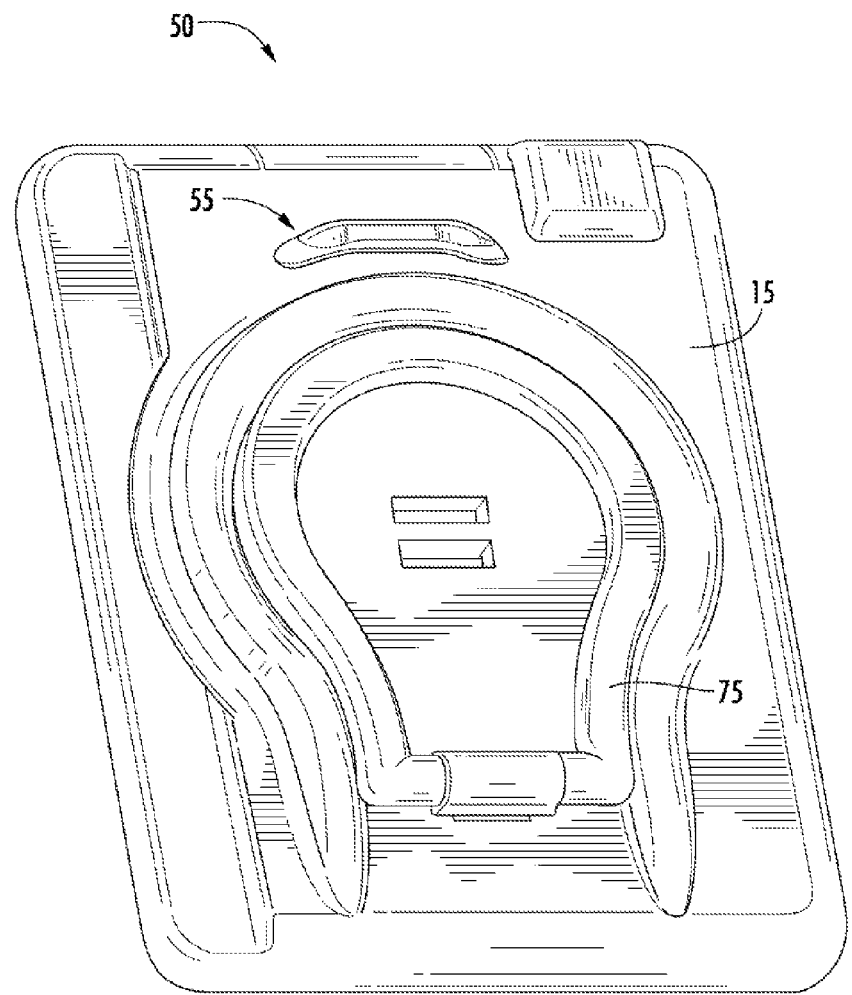
FIG. 6 is a perspective view of an exemplary electronic-device casing assembly according to the present invention.
Figure 7:
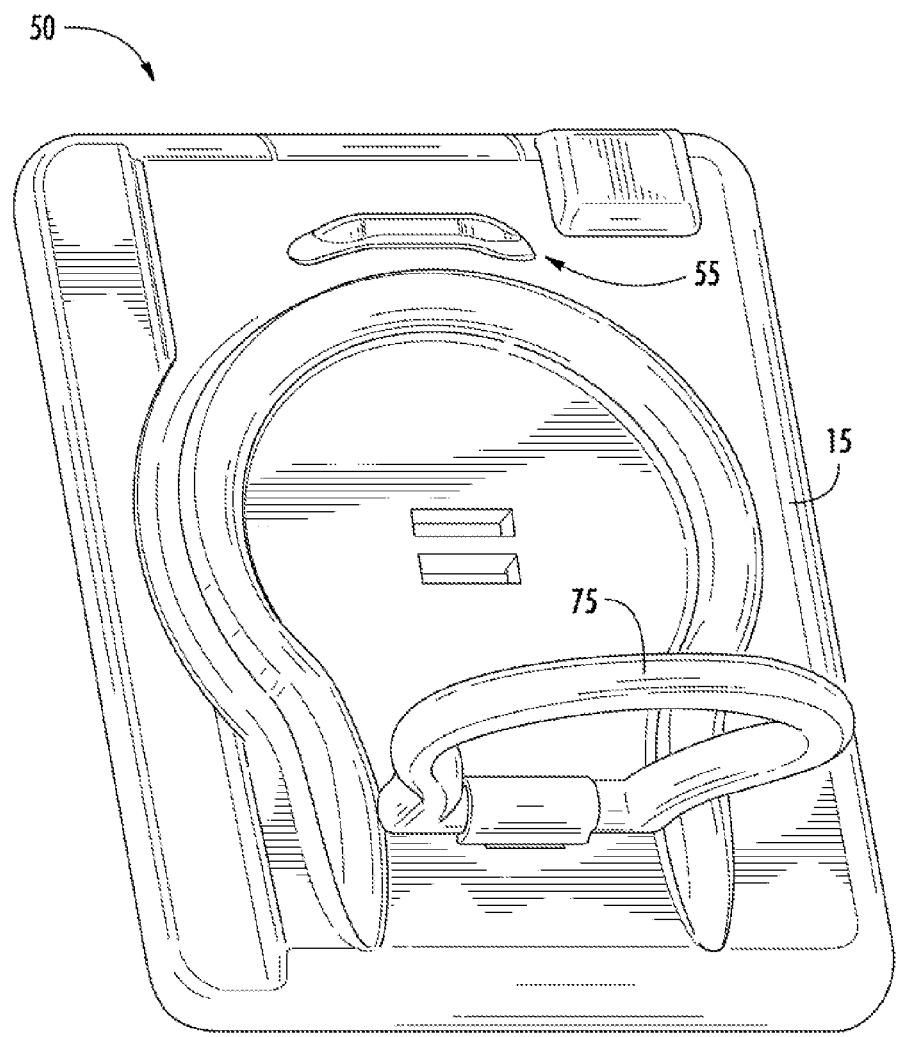
FIG. 7 is a perspective view of an exemplary electronic-device casing assembly according to the present invention.

Referring now to FIGS. 5-7, in an alternative embodiment, the electronic-device casing assembly 50 according to the present disclosure may include an arm support 75 (e.g., an arm loop). The arm support 75 helps secure a user's arm to the electronic-device casing assembly 50. The arm support 75 may work in conjunction with a handle 10. The arm support 75 helps position the electronic-device casing assembly 50 on the user's arm in such a way that the user's hand is positioned on the electronic-device case 15 and the user's fingers are near the finger rest 70. The arm support 75 advantageously allows for more of the weight of the electronic-device casing assembly 50 to be supported by the user's arm, as opposed to other configurations which may place substantially all of the weight on the user's hand and/or wrist. Therefore, the arm support 75 may result in decreased user fatigue, especially during periods of extended use. The arm support 75 may be hingedly connected (e.g., connected with a hinge mechanism) to the electronic-device case 15 such that when it is not in use the arm support 75 can be positioned adjacent to the electronic-device case 15 for easier storage. When in use, the arm support 75 may be swung out either for positioning the user's arm through the arm support 75 or for using the arm support 75 as a stand for the electronic-device casing assembly 50.

FIG. 5 depicts an electronic-device casing assembly 50 that includes both a handle 10 and an arm support 75. FIG. 6 depicts an electronic-device casing assembly 50 that includes an arm support 75 but no handle 10. FIG. 7 depicts an electronic-device casing assembly 50 with an arm support 75 in the extended (e.g., outwardly-rotated) position. The user may place the arm support 75 into this extended position either for inserting the user's arm into the arm support 75 or for using the arm support 75 as a stand to hold the electronic-device casing assembly 50 in an upright (e.g. vertical) position when placed on a supporting surface.

Figure 8:
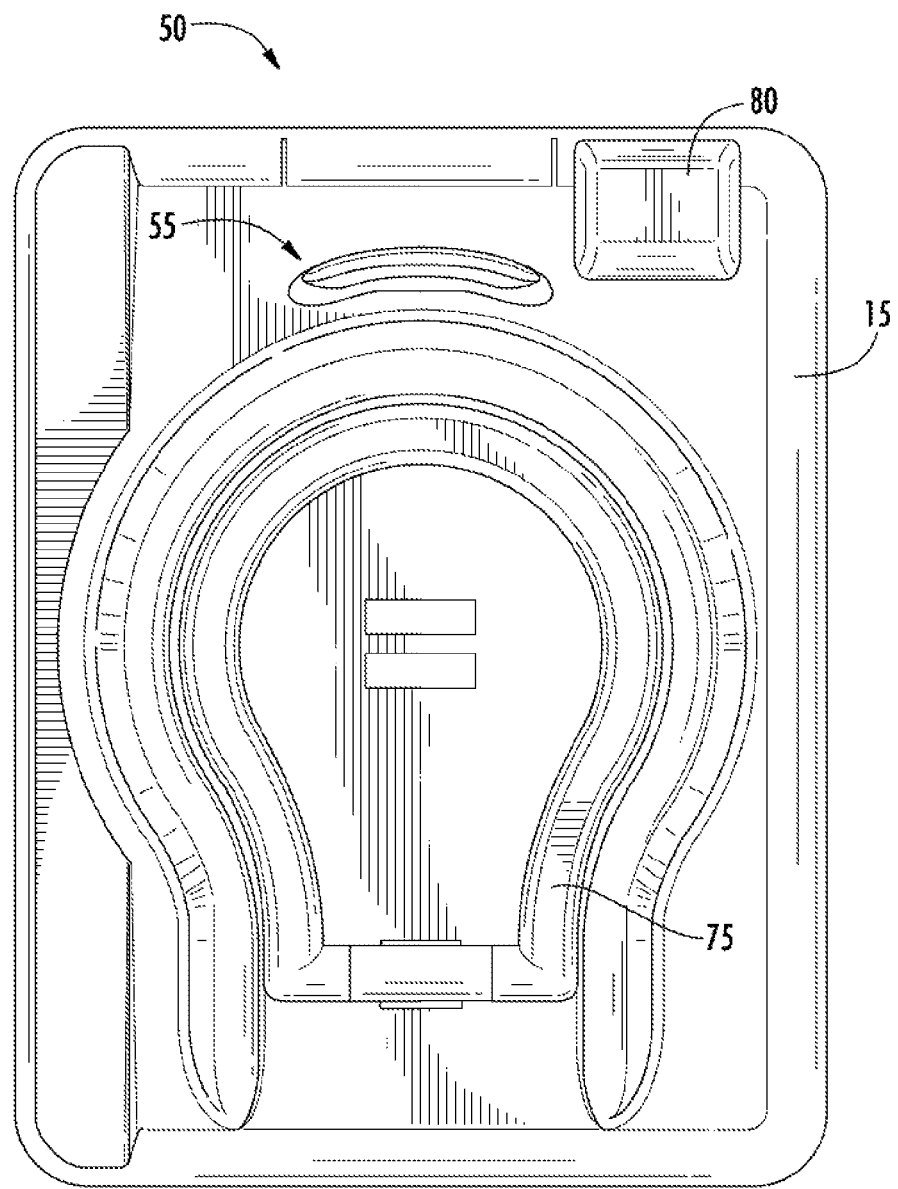
FIG. 8 is a rear view of an exemplary electronic-device casing assembly according to the present invention.

Referring now to FIG. 8, in an exemplary embodiment, the electronic-device casing assembly 50 according to the present disclosure may include a symbol reading module 80. In one embodiment, the symbol reading module 80 reads code symbols (e.g., barcodes) using one or more code symbol reading techniques, including laser scanning and optical-character recognition (OCR). Typically, the symbol reading module 80 is communicatively connected to the mobile computer device that is positioned within the electronic-device casing assembly 50, thereby facilitating the transmission of the code symbol information from the symbol reading module 80 to the mobile computer device 50. Typically, a user initiates a scan (e.g., reading) of a code symbol with the symbol reading module 80 by activating a switch 25 that is communicatively connected to the symbol reading module 80. The user may bring the object bearing the code symbol into the symbol reading module's 80 field-of-view either by moving the electronic-device casing assembly 50 into an appropriate position (e.g. by moving the device with the user's hand that is secured to the device by a handle 10 and/or an arm support 75), or moving the object with the user's free hand until it is within the field-of-view. In an alternative embodiment, the symbol reading module 80 may be a transparent window or aperture. When a mobile computer device having a built-in code symbol reader is placed into the electronic-device casing assembly 50, the mobile computer device's code symbol reader can scan the object through the symbol reading module 80 (e.g., by emitting a laser through the translucent symbol reading module 80).

Figure 9:
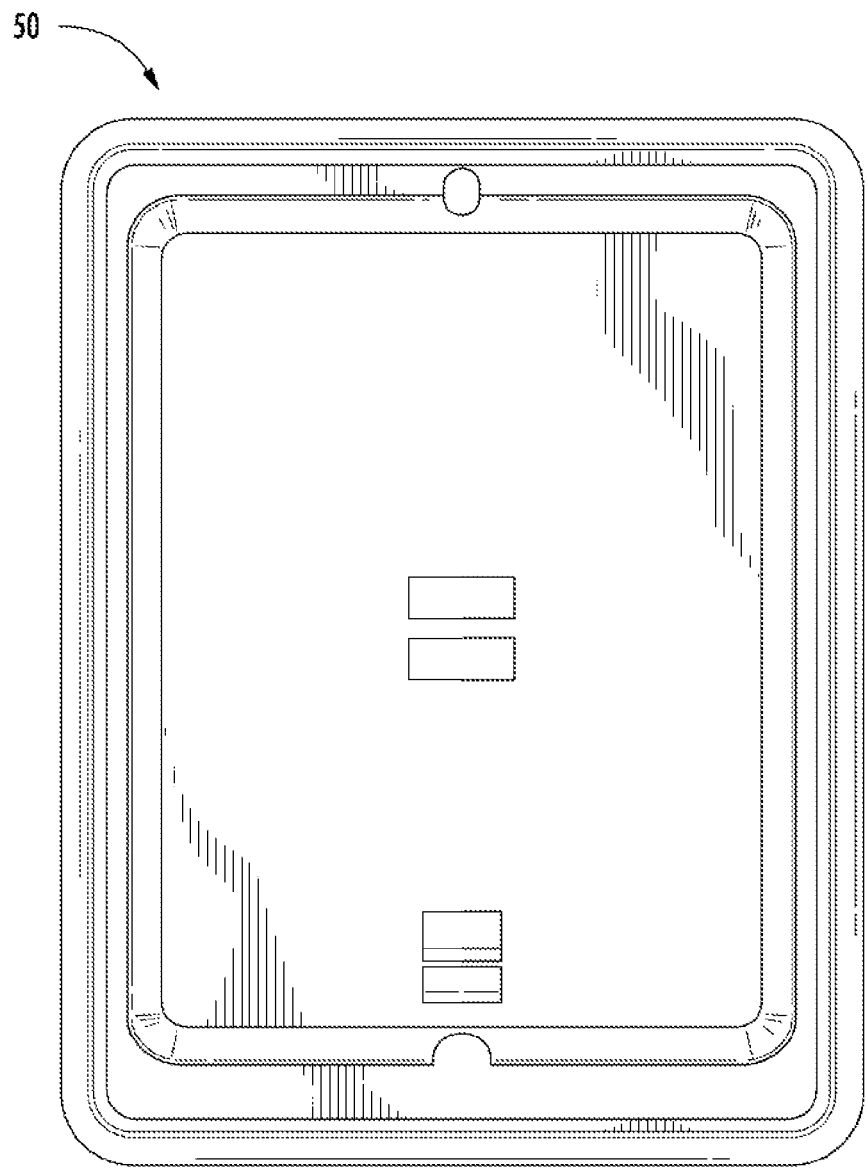
FIG. 9 is a front view of an exemplary electronic-device casing assembly according to the present invention.

FIG. 9 depicts the front of an exemplary electronic-device casing assembly. Typically, the front defines an opening through which the display screen of the mobile computer device may be viewed and/or provided with tactile input (e.g., by touching the touchscreen).

Figure 10:
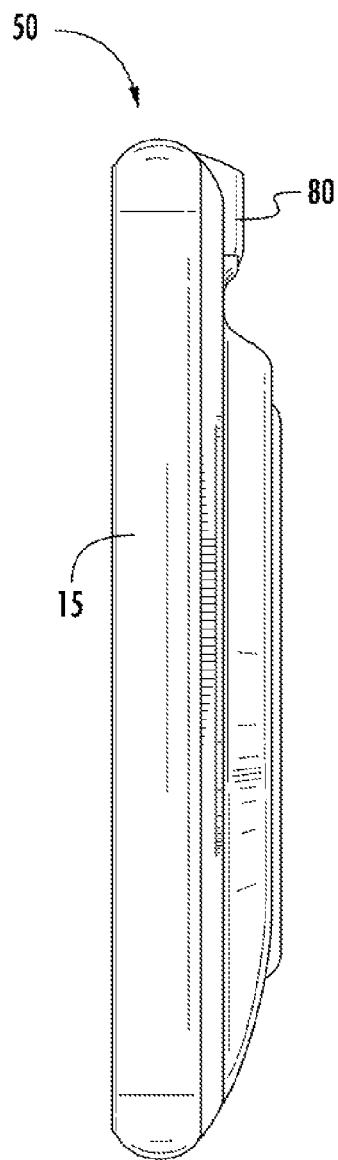
FIG. 10 is a right side view of an exemplary electronic-device casing assembly according to the present invention.
Figure 11:
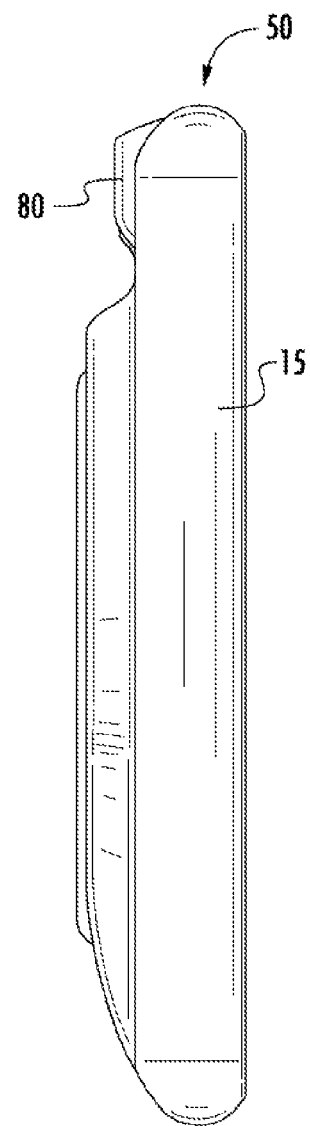
FIG. 11 is a left side view of an exemplary electronic-device casing assembly according to the present invention.

FIGS. 10 and 11 depict side views of an exemplary embodiment of the electronic-device casing assembly 50 having a symbol reading module 80.

Figure 12:
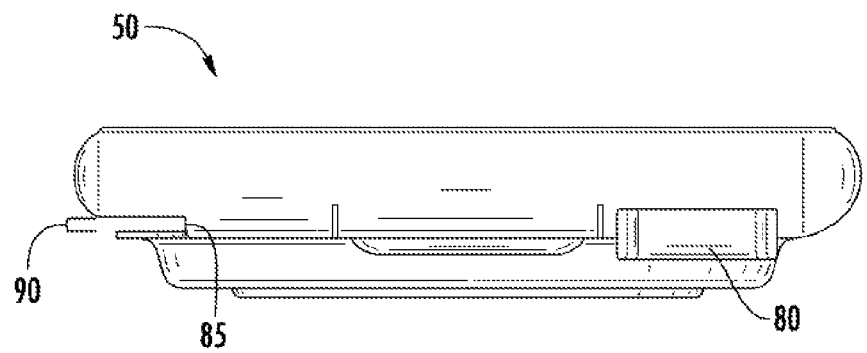
FIG. 12 is a top plan view of an exemplary electronic-device casing assembly according to the present invention.
Figure 13:
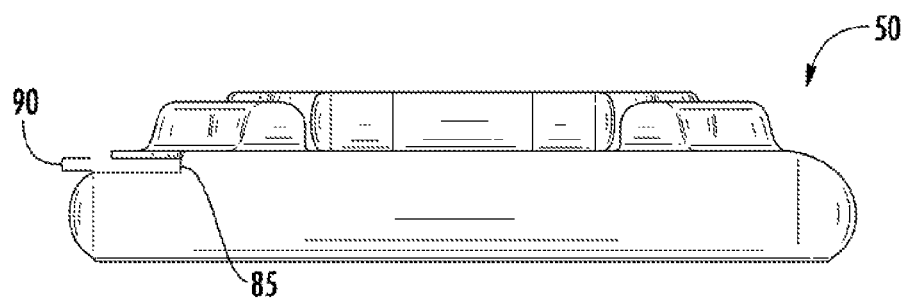
FIG. 13 is a bottom plan view of an exemplary electronic-device casing assembly according to the present invention.
Figure 14:
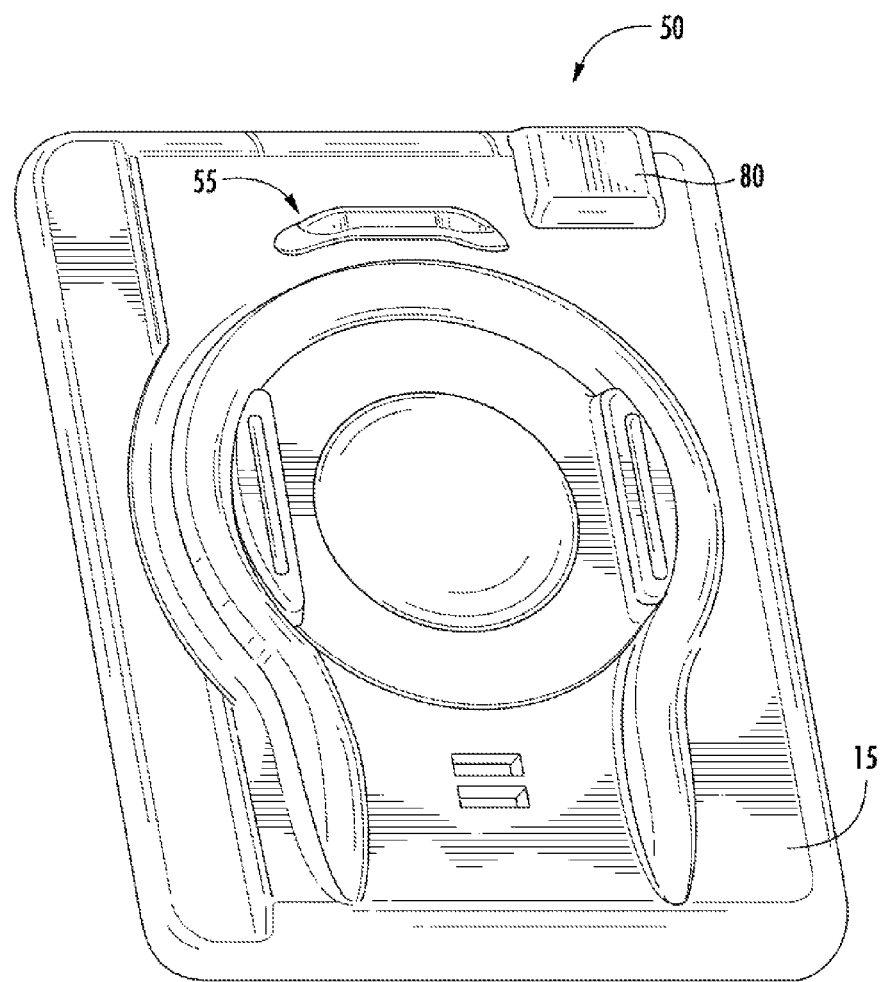
FIG. 14 is a rear perspective view of an exemplary electronic-device casing assembly according to the present invention.
Figure 15:
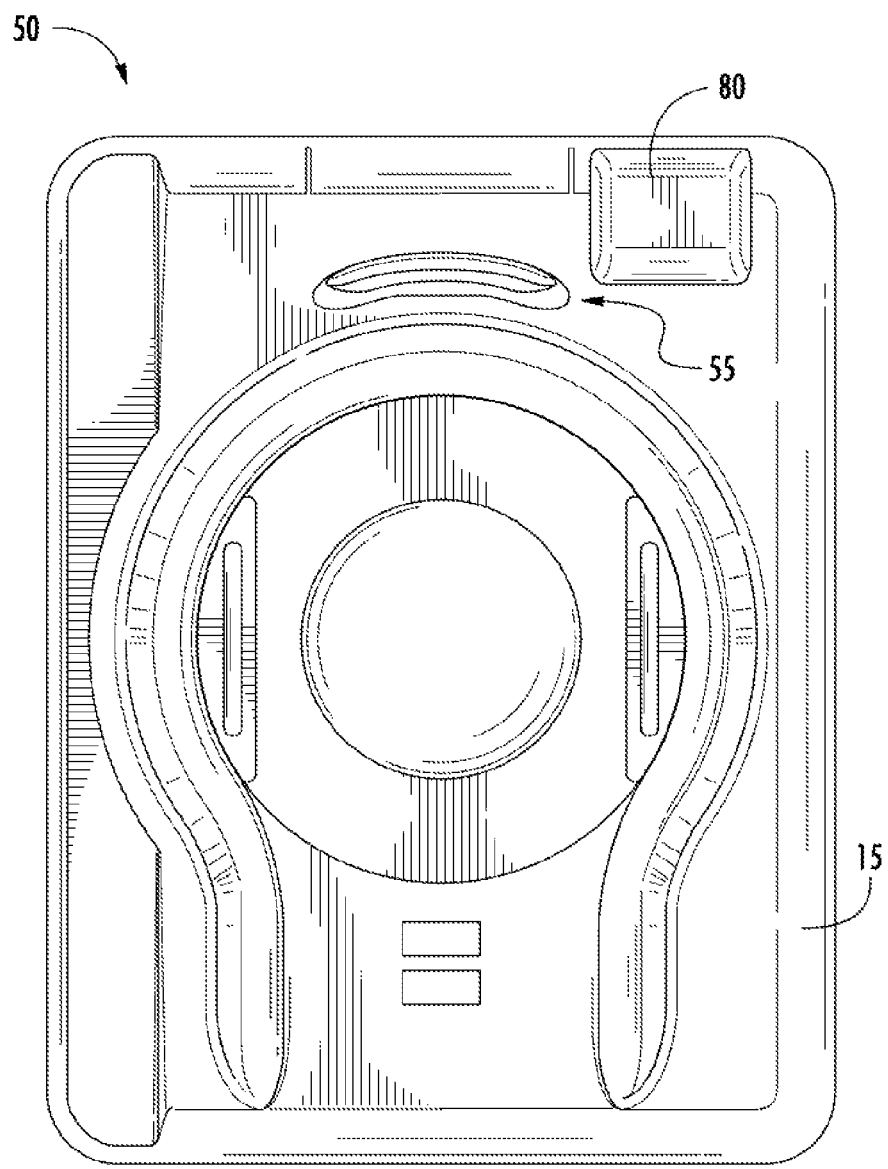
FIG. 15 is a rear view of an exemplary electronic-device casing assembly according to the present invention.
Figure 16:
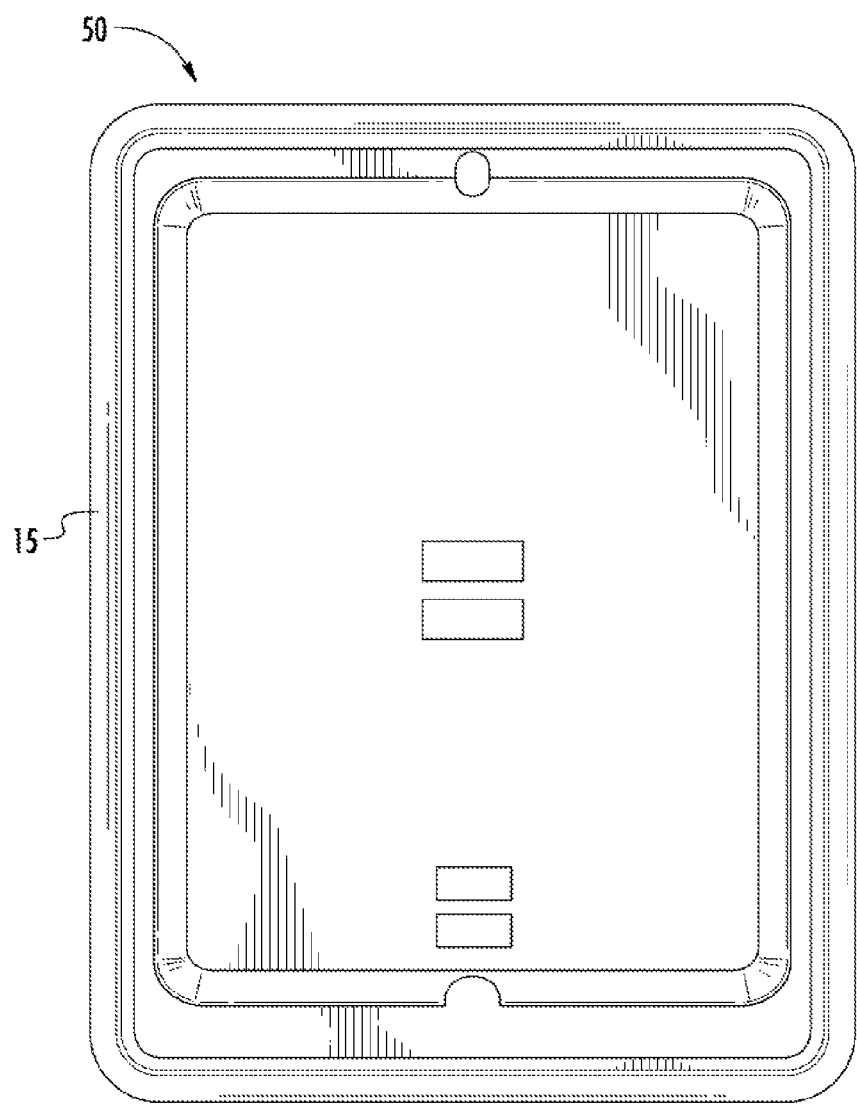
FIG. 16 is a front view of an exemplary electronic-device casing assembly according to the present invention.
Figure 17:
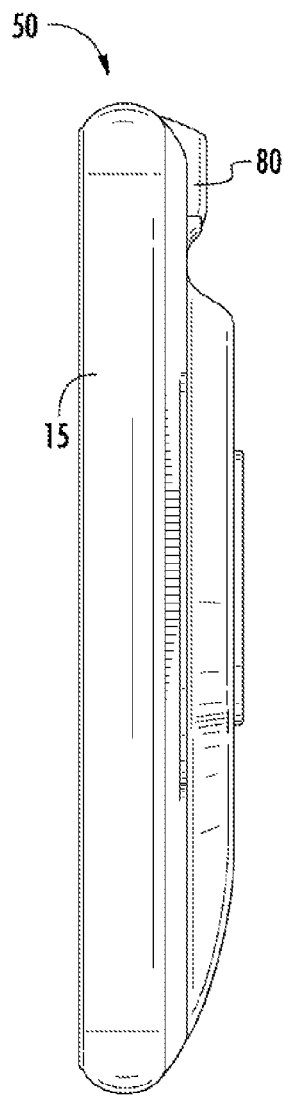
FIG. 17 is a right side view of an exemplary electronic-device casing assembly according to the present invention.
Figure 18:
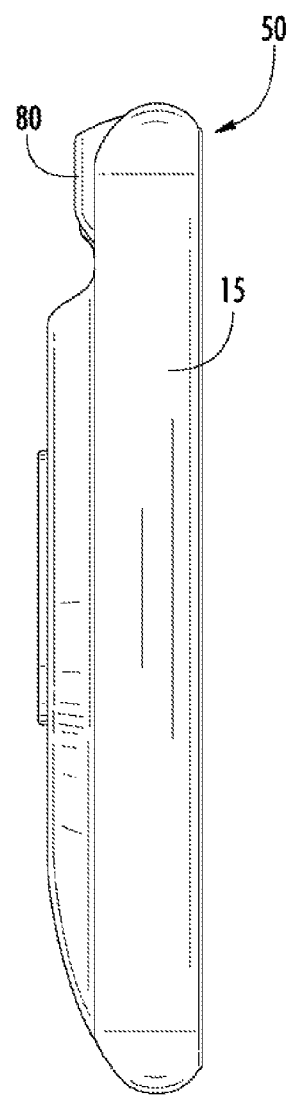
FIG. 18 is a left side view of an exemplary electronic-device casing assembly according to the present invention.
Figure 19:
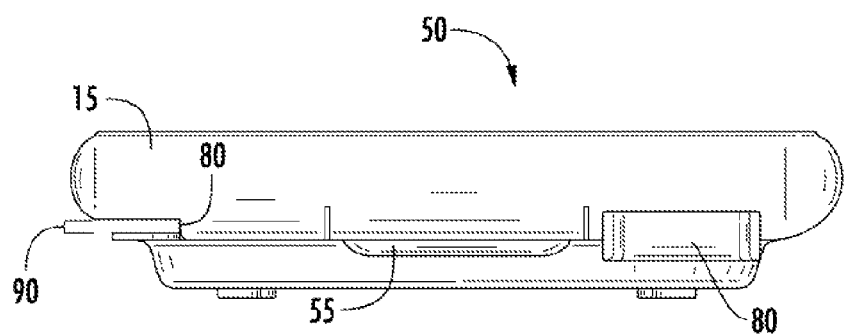
FIG. 19 is a top plan view of an exemplary electronic-device casing assembly according to the present invention.
Figure 20:
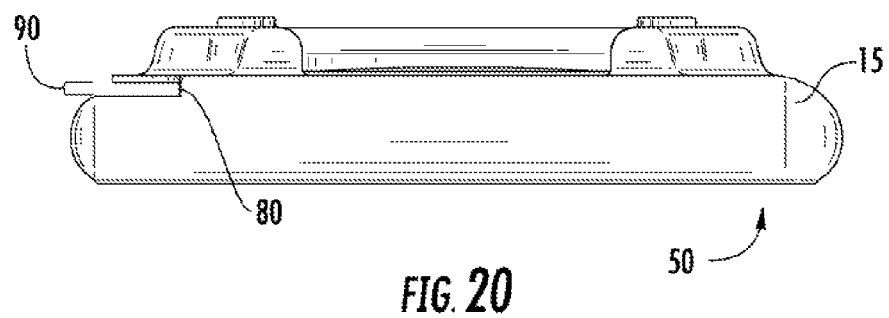
FIG. 20 is a bottom plan view of an exemplary electronic-device casing assembly according to the present invention.
Figure 21:
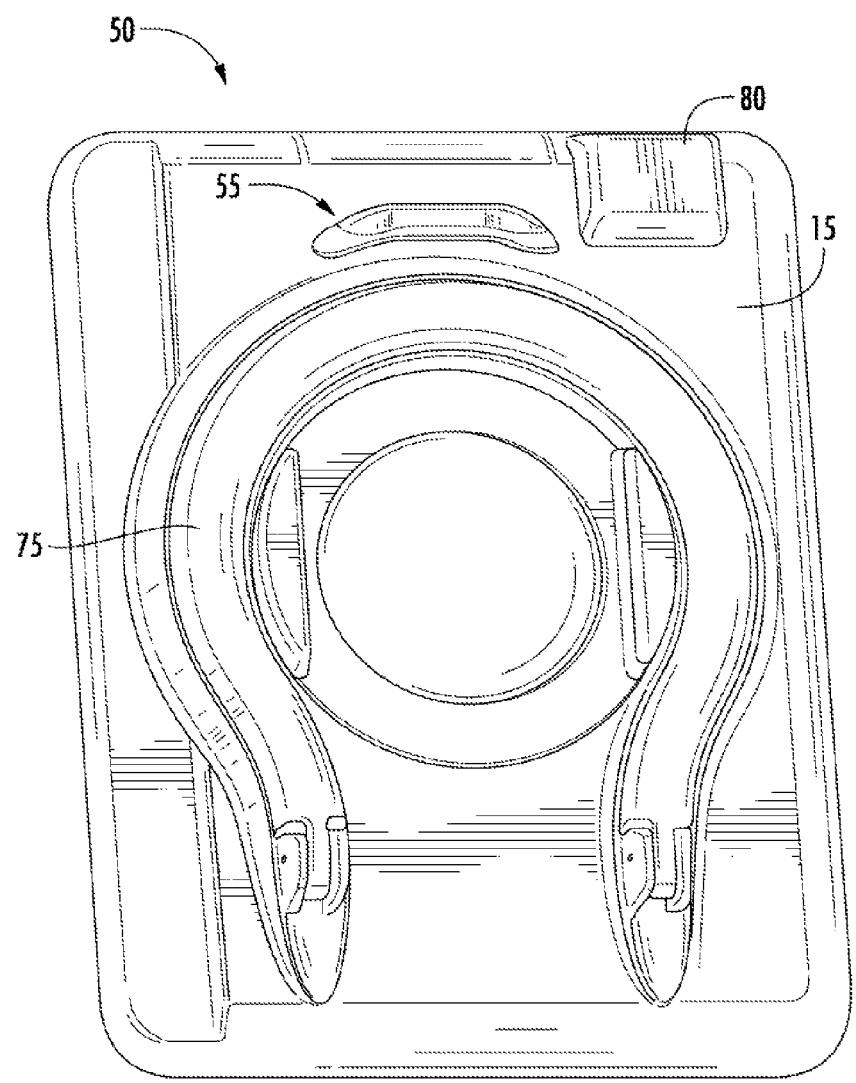
FIG. 21 is a rear view of an exemplary electronic-device casing assembly according to the present invention.
Figure 22:
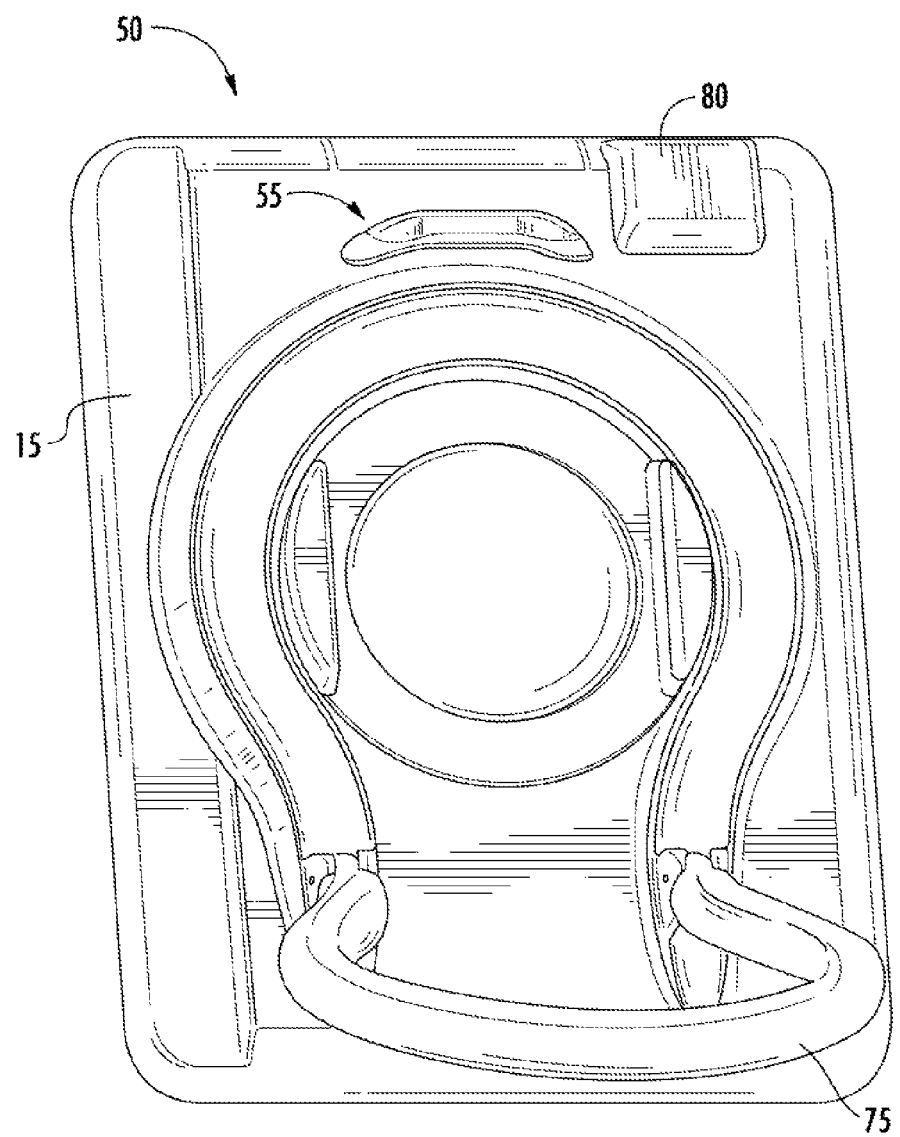
FIG. 22 is a rear view of an exemplary electronic-device casing assembly according to the present invention.
Figure 23:
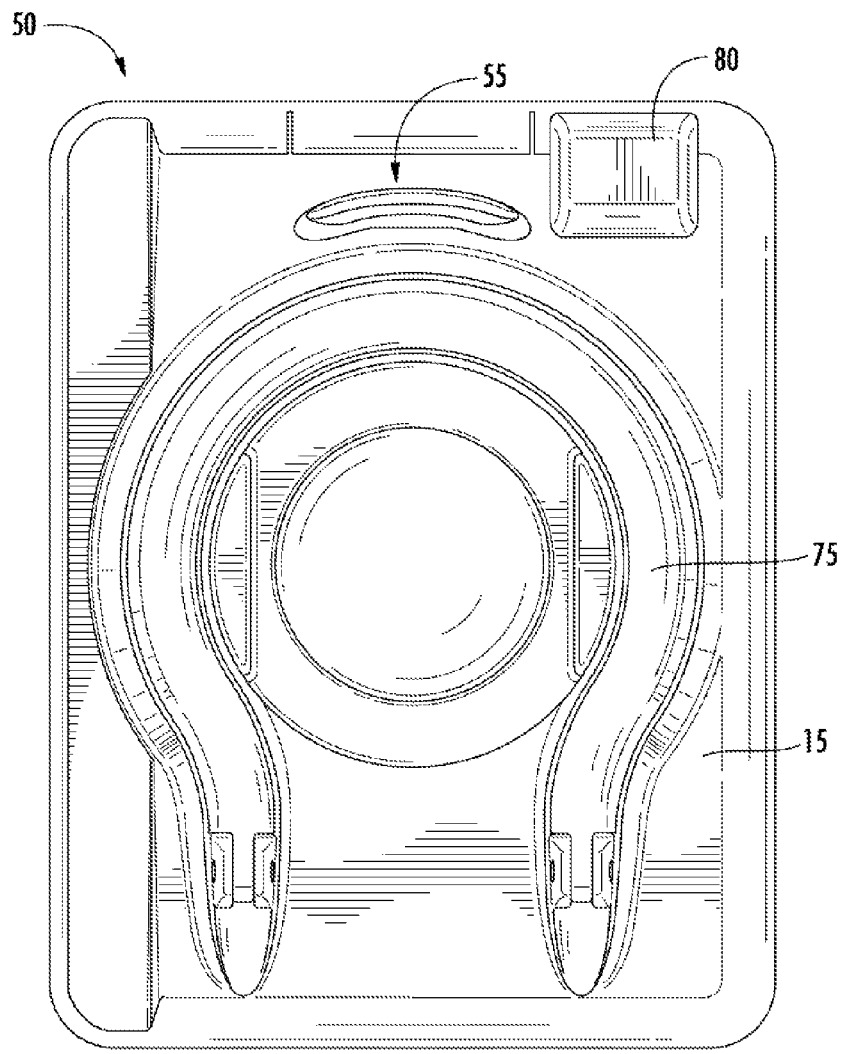
FIG. 23 is a rear view of an exemplary electronic-device casing assembly according to the present invention.
Figure 24:
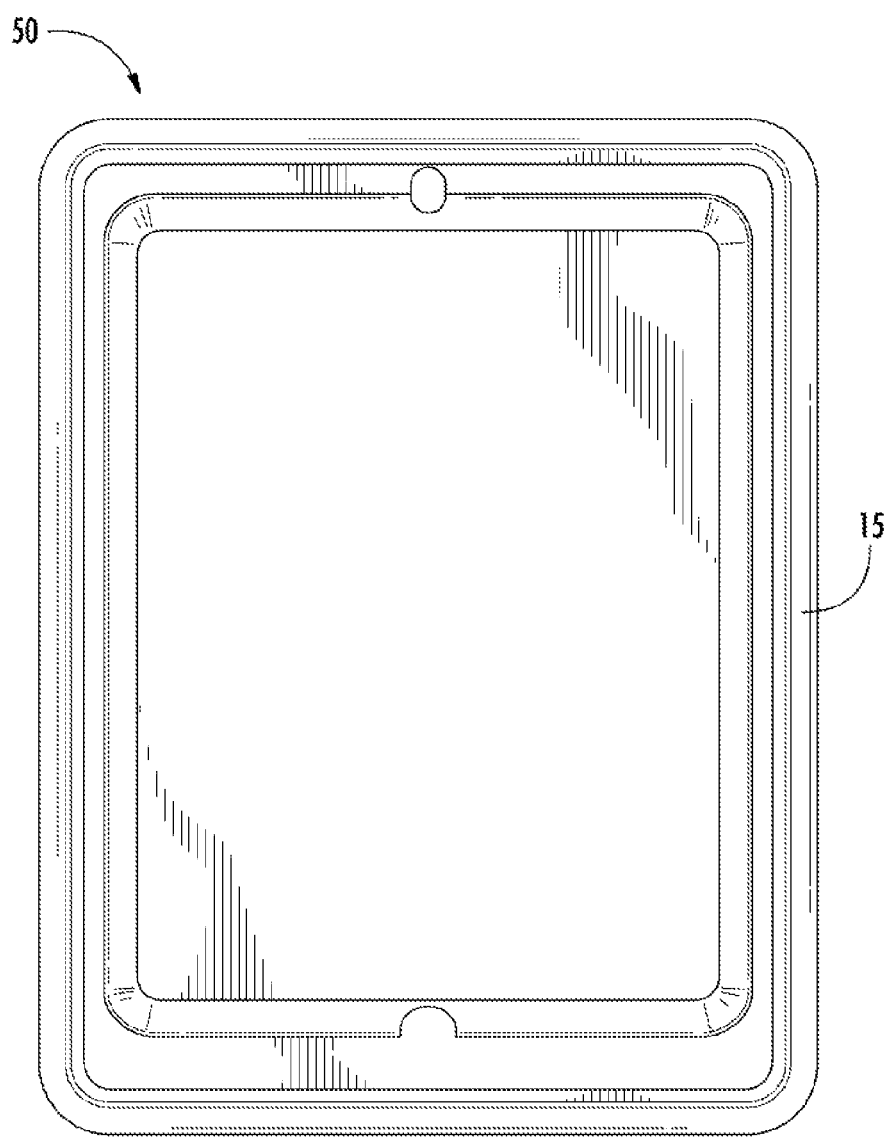
FIG. 24 is a front view of an exemplary electronic-device casing assembly according to the present invention.
Figure 25:
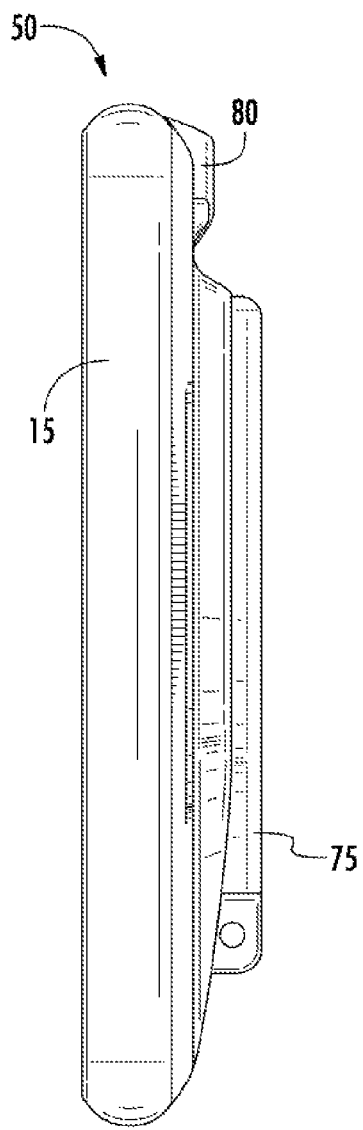
FIG. 25 is a right side view of an exemplary electronic-device casing assembly according to the present invention.
Figure 26:
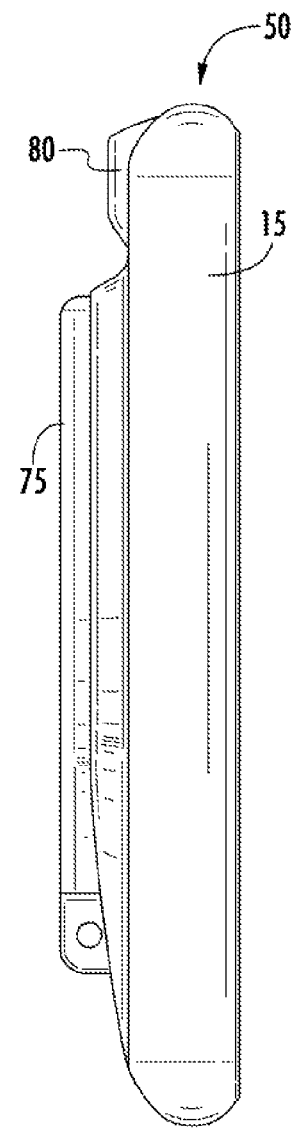
FIG. 26 is a left side view of an exemplary electronic-device casing assembly according to the present invention.
Figure 27:
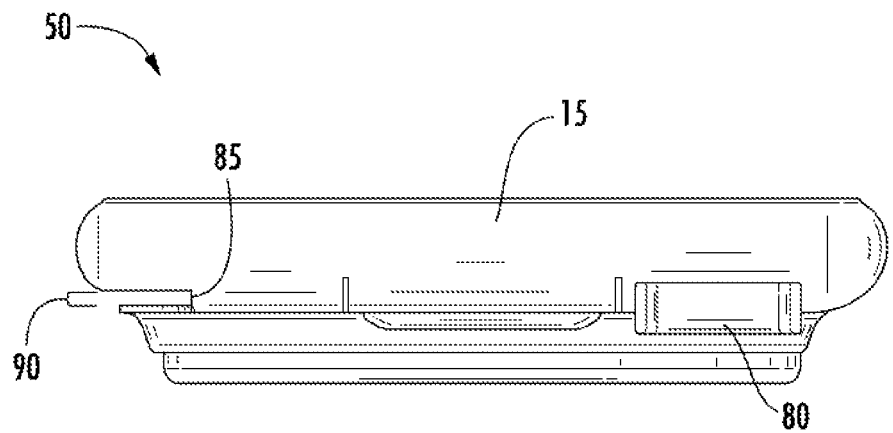
FIG. 27 is a top plan view of an exemplary electronic-device casing assembly according to the present invention.
Figure 28:
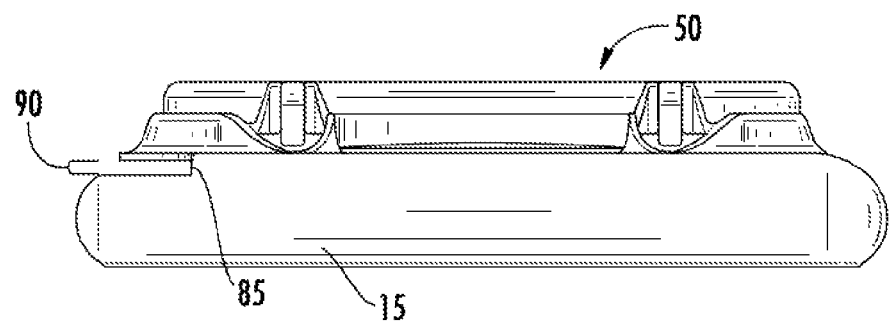
FIG. 28 is a bottom plan view of an exemplary electronic-device casing assembly according to the present invention.

FIGS. 12 and 13 depict yet another embodiment of the electronic-device casing assembly 50 according to the present disclosure, which alternative embodiment includes a magnetic card reading module 85. The magnetic card reading module 85 may is configured to read data that has been stored on a magnetically-encoded card (e.g., card-shaped storage medium, magnetic stripe card, mag-stripe card, swipe card, etc.). Typically, the magnetic card reading module 85 is substantially adjacent to a slot 90 defined by the electronic-device case 15. Alternatively, the magnetic card reading module 85 may define a slot 90 for receiving the magnetically-encoded card. Typically, the user swipes the magnetically-encoded card through the slot 90, whereupon the magnetic card reading module 80 reads the information encoded on the magnetically-encoded card, typically through the use of a magnetic reading head positioned adjacent to the slot 90. Typically, the magnetic card reading module 80 is communicatively connected (e.g., by wired or wireless connection) to the mobile computer device such that the decoded information can be transmitted from the magnetic card reading module 80 to the mobile computer device.

FIGS. 14 through 28 depict other exemplary embodiments of the electronic-device casing assembly 50 using the same reference numerals.

To supplement the present disclosure, this application incorporates entirely by reference the following patents, patent application publications, and patent applications: U.S. Pat. No. 6,832,725; U.S. Pat. No. 7,159,783; U.S. Pat. No. 7,413,127; U.S. Pat. No. 7,726,575; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,863; U.S. Pat. No. 8,459,557; U.S. Pat. No. 8,469,272; U.S. Pat. No. 8,474,712; U.S. Pat. No. 8,479,992; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012

(Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); and U.S. patent application Ser. No. 13/930,913 for a Mobile Device Having an Improved User Interface for Reading Code Symbols, filed Jun. 28, 2013 (Gelay et al.).

To supplement the present disclosure, this application incorporates entirely by reference U.S. patent application Ser. No. 29/459,620 for an Electronic Device Enclosure, filed Jul. 2, 2013 (London et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A handle for an electronic-device case, comprising:
a hand strap;
a switch for generating a signal, the switch being integral with the hand strap; and
a connector for affixing the hand strap to the electronic-device case;
wherein the switch is positioned on the connector.

2. The handle according to claim 1, wherein the connector is a rotating connector that permits the electronic-device case to rotate with respect to the hand strap.

3. The handle according to claim 1, wherein the connector is a swivel-mount connector that permits the electronic-device case to swivel with respect to the hand strap.

4. The handle according to claim 1, wherein a second switch is positioned on the hand strap.

5. The handle according to claim 1, wherein a second switch is positioned on the electronic-device case.

6. The handle according to claim 1, wherein the switch is adapted for communicative connection with the electronic-device case.

7. The handle according to claim 1, wherein the switch is adapted for communicative connection with a computer.

8. An electronic-device casing assembly, comprising:
an electronic-device case for holding a mobile computer device;
a hand strap for securing a user's hand to the electronic-device case, the hand strap being connected to the electronic-device case;
a connector for affixing the hand strap to the electronic-device case; and
a switch for generating a signal, wherein the switch is configured for operation by the user's hand, and wherein the switch is positioned on the connector;
wherein the electronic-device casing assembly is adapted to communicate with the mobile computer device.

9. The electronic-device casing assembly according to claim 8, wherein the connector permits the electronic-device case to rotate with respect to the hand strap.

10. The electronic-device casing assembly according to claim 8, wherein a second switch is positioned on the hand strap.

11. The electronic-device casing assembly according to claim 8, wherein a second switch is positioned on the electronic-device case.

12. The electronic-device casing assembly according to claim 8, wherein the switch is communicatively connected to the electronic-device case.

13. The electronic-device casing assembly according to claim 8, wherein the switch is adapted for communicative connection with the mobile computer device.

14. An electronic-device casing assembly, comprising:
   an electronic-device case for securing a mobile computer device; and
   a finger support positioned on the electronic-device case to facilitate one-handed operation of the electronic-device casing assembly and the mobile computer device, the finger support including (i) a first signal-generating switch, (ii) a second signal-generating switch, and (iii) a finger rest positioned between the first signal-generating switch and the second signal-generating switch;
   wherein the electronic-device casing assembly is adapted to communicate with the mobile computer device.

15. The electronic-device casing assembly according to claim 14, comprising a hand strap for securing a user's hand to the electronic-device case, the hand strap being connected to the electronic-device case.

16. The electronic-device casing assembly according to claim 15, comprising an arm support for securing a user's arm to the electronic-device casing assembly so as to position the user's hand upon the electronic-device case and the user's fingers near the finger rest.

17. The electronic-device casing assembly according to claim 15, wherein the first signal-generating switch and/or the second signal-generating switch are communicatively connected to the electronic-device case.

18. The electronic-device casing assembly according to claim 15, wherein the first signal-generating switch and/or the second signal-generating switch are adapted for communicative connection with the mobile computer device.

19. The electronic-device casing assembly according to claim 14, comprising a connector for affixing the hand strap to the electronic-device case.

20. The electronic-device casing assembly according to claim 19, wherein the connector permits the electronic-device case to rotate with respect to the hand strap.

* * * * *